US010397193B2

(12) United States Patent
Ling et al.

(10) Patent No.: US 10,397,193 B2
(45) Date of Patent: Aug. 27, 2019

(54) BLIND CLOUD DATA LEAK PROTECTION

(71) Applicant: Dell Software Inc., Round Rock, TX (US)

(72) Inventors: Hui Ling, Shanghai (CN); Zhong Chen, Fremont, CA (US)

(73) Assignee: SONICWALL INC., Milpitas, CA (US)

( * ) Notice: Subject to any disclaimer, the term of this patent is extended or adjusted under 35 U.S.C. 154(b) by 183 days.

(21) Appl. No.: 15/206,805

(22) Filed: Jul. 11, 2016

(65) Prior Publication Data

US 2018/0013730 A1 Jan. 11, 2018

(51) Int. Cl.
*H04L 29/06* (2006.01)
*G06F 21/62* (2013.01)

(52) U.S. Cl.
CPC ...... *H04L 63/0428* (2013.01); *G06F 21/6209* (2013.01); *H04L 63/06* (2013.01); *H04L 63/20* (2013.01)

(58) Field of Classification Search
CPC ..... H04L 63/0428; H04L 63/20; G06F 21/60; G06F 2221/2107
See application file for complete search history.

(56) References Cited

U.S. PATENT DOCUMENTS

| 2012/0066346 A1* | 3/2012 | Virmani | G06F 17/3012 |
| | | | 709/219 |
| 2012/0303827 A1* | 11/2012 | Neystadt | H04L 63/107 |
| | | | 709/229 |
| 2017/0083717 A1* | 3/2017 | Medvedev | G06F 21/6218 |

OTHER PUBLICATIONS

Shu et al,Privacy-Preserving Detection of Sensitive Data Exposure, IEEE, May 2015, 12 pages (Year: 2015).*

* cited by examiner

*Primary Examiner* — Christopher C Harris
(74) *Attorney, Agent, or Firm* — Polsinelli LLP

(57) ABSTRACT

Systems and methods for blind data leak prevention are provided. A first computer can determine if encrypted data matches a rule even without the encryption key used to encrypt the data. The first computer may encrypt the rule with a second encryption key and send the encrypted rule to a second computer, which may then encrypt the rule with the first encryption key—that is inaccessible to the first computer—and send the doubly encrypted rule back to the first computer. The first computer can then partially decrypt the rule using the second encryption key. The second computer can then encrypt data with the first encryption key and send to the first computer. The first computer can then determine if the partially encrypted rule matches the encrypted data.

12 Claims, 4 Drawing Sheets

FIGURE 3

300a confidential

302

| co | nf | id | en | ti | al |
|---|---|---|---|---|---|
| 0x81AC | 0x1A1E | 0x91F9 | 0x9312 | 0x9A0A | 0x8FDC |

300b

This contains confidential information

304

| Th | is | c | on | ta | in | s | co | nf | id | en | ti | al | i | nf | or | ma | ti | on |
|---|---|---|---|---|---|---|---|---|---|---|---|---|---|---|---|---|---|---|
| 0x74DE | 0x770B | 0xDBC1 | 0xD318 | 0xF6CD | 0x8820 | 0xB5F2 | 0x81AC | 0x1A1E | 0x91F9 | 0x9312 | 0x9A0A | 0x8FDC | 0x76EA | 0x1A1E | 0xD38E | 0x91DA | 0x9A0A | 0xD318 |

300c

This has confidential information

| Th | is | h | as | c | on | fi | de | nt | ia | l | in | fo | rm | at | io | n |
|---|---|---|---|---|---|---|---|---|---|---|---|---|---|---|---|---|
| 0x74DE | 0x770B | 0x4AD3 | 0xFF82 | 0xDBC1 | 0xD318 | 0xC5F8 | 0x6CFF | 0xC609 | 0xA0E8 | 0x4806 | 0x8820 | 0x2037 | 0x9747 | 0x3689 | 0xA5C5 | 0x5B40 |

300d his has confidential information

306

| hi | s | ha | s | co | nf | id | en | ti | al | i | nf | or | ma | ti | on |
|---|---|---|---|---|---|---|---|---|---|---|---|---|---|---|---|
| 0xD4E0 | 0xB5F2 | 0x5D94 | 0xB5F2 | 0x81AC | 0x1A1E | 0x91F9 | 0x9312 | 0x9A0A | 0x8FDC | 0x76EA | 0x1A1E | 0xD38E | 0x91DA | 0x9A0A | 0xD318 |

...confidential <end>

| _c | on | fi | de | nt | ia | l |
|---|---|---|---|---|---|---|
| 0xDDEA | 0xD318 | 0xC5F8 | 0x6CFF | 0xC609 | 0xA0E8 | ? |

400b

...confidentiaal <end>

| _c | on | fi | de | nt | ia | al |
|---|---|---|---|---|---|---|
| 0xDDEA | 0xD318 | 0xC5F8 | 0x6CFF | 0xC609 | 0xA0E8 | 0x8FDC |

400c

*confidentiaal

| *c | on | fi | de | nt | ia | al |
|---|---|---|---|---|---|---|
| 0x53CF | 0xD318 | 0xC5F8 | 0x6CFF | 0xC609 | 0xA0E8 | 0x8FDC |

400d

<space> confidentiaal

| c | on | fi | de | nt | ia | al |
|---|---|---|---|---|---|---|
| 0xDBC1 | 0xD318 | 0xC5F8 | 0x6CFF | 0xC609 | 0xA0E8 | 0x8FDC |

FIGURE 4

BLIND CLOUD DATA LEAK PROTECTION

BACKGROUND OF THE INVENTION

1. Field of the Invention

The present invention generally concerns data leak prevention. More particularly, the present invention concerns blind data leak prevention using encrypted files.

2. Description of the Related Art

Organizations typically store and maintain confidential information of various forms. Confidential information can sometimes be difficult to track and keep within the organization's networks. This can be due to the large quantity of such information, the large number of people or devices with access to the information, or the intermingling of such information with non-confidential information. As an organization interfaces with an external network (e.g., the Internet), the organization is exposed to data leaks. For example, an employee might email a file with confidential information to a friend, or a partner organization may have access to the organization's network and may attempt to access a file with confidential information.

Data leak prevention (DLP) may involve preventing confidential information from leaving an organization's network. Traditional approaches require the data leak prevention system to have access to unencrypted files (which may contain confidential information) in order to determine whether the files do in fact have confidential information. Laws, regulations, and other priorities might severely limit what parties have access to the confidential information. Such laws, regulations, and priorities might make it difficult to utilize a third-party data leak prevention solution. Scenarios where there is little or no trust between a data owner and the data leak prevention scanning software can make it impossible for the data owner to confidently use the data leak prevention scanning software.

Traditionally, a physical datacenter for the enterprise would store the enterprise data. The data center would also run data leak prevention scanning software. As more enterprises migrate their data to the cloud, these enterprises are more cautious about the storage and transmission of their data. For example, the enterprise may choose to store their data in an encrypted form. As another example, the enterprise may also use a software as a service (SaaS) DLP provider that requires the enterprise to send their data from their enterprise cloud to the DLP provider. Because the enterprise does not have full control of the security at the DLP provider, it can be said that the enterprise does not fully "trust" the DLP provider. As such, it can be undesirable to provide the DLP provider with unencrypted access to the enterprise data.

SUMMARY OF THE CLAIMED INVENTION

Systems and methods for blind data leak prevention are provided. A first computer can determine if encrypted data matches a rule even without the encryption key used to encrypt the data. The first computer may encrypt the rule with a second encryption key and send the encrypted rule to a second computer, which may then encrypt the rule with the first encryption key—that is inaccessible to the first computer—and send the doubly encrypted rule back to the first computer. The first computer can then partially decrypt the rule using the second encryption key. The second computer can then encrypt data with the first encryption key and send to the first computer. The first computer can then determine if the partially encrypted rule matches the encrypted data.

A first claimed embodiment of the present disclosure involves a method for blind data leak protection. The method includes receiving a rule encrypted with a first encryption key and sent to a first computing device from a second computing device. The first encryption key is accessible to the second computing device but not the first computing device. The method further includes receiving data encrypted with the first encryption key and sent to a first computing device from a second computing device, determining that the encrypted data includes the encrypted rule, and processing the encrypted data based on the determination.

A second claimed embodiment of the present invention involves a system for blind data leak prevention. The system includes a first computing device with a communication interface that receives a rule encrypted with a first encryption key from a second computing device where the first encryption key is not accessible to the first computing device. The communication interface may further receive data encrypted with the first encryption key from the second computing device. The first computing device may also include memory that stores instructions that are executable by a processor to determine that the encrypted data includes the rule and to process the encrypted data based on the determination.

A third-claimed embodiment of the present invention concerns a non-transitory computer-readable storage medium having embodied thereon a program executable by a processor to perform a method for data leak prevention as described above.

BRIEF DESCRIPTION OF THE DRAWINGS

FIG. 3 illustrates an exemplary implementation of a method for matching encrypted data to rules.

FIG. 4 illustrates an exemplary encryption technique.

DETAILED DESCRIPTION

When an enterprise (or any company, individual, or other entity) relies on a data leak prevention (DLP) solution that is not run on the enterprise datacenter, the enterprise is required to send enterprise data to the DLP provider. Because the enterprise does not have control of the security of the DLP provider, it can be said that the enterprise does not trust the DLP provider. Within a cloud environment (e.g., where the enterprise data is not hosted at an enterprise datacenter), the enterprise typically does not trust the DLP solution. This may occur because the DLP solution is hosted by the DLP provider. When the enterprise does not trust the DLP provider, the enterprise will not wish to provide unencrypted data to the DLP solution.

In order to still make use of a DLP solution even if the enterprise does not trust the DLP provider, the enterprise and DLP provider can implement "blind" DLP techniques as herein disclosed. A blind cloud DLP technique may include the enterprise encrypting the data so that the DLP provider cannot decrypt the data. The DLP provider can then compare the encrypted data with encrypted DLP rules, the encrypted DLP rules having been encrypted using the same encryption as the data by the enterprise. For example, the DLP provider can send the DLP rules to the enterprise, the enterprise can encrypt the DLP rules, and the enterprise can send the encrypted DLP rules to the DLP provider. With the encrypted data and the encrypted rules, the DLP provider can find a match notwithstanding it being "blind" to the information contained within the enterprise data.

Systems and methods for blind data leak prevention are provided. A first computer can determine if encrypted data matches a rule even without the encryption key used to encrypt the data. The first computer may encrypt the rule with a second encryption key and send the encrypted rule to a second computer, which may then encrypt the rule with the first encryption key—that is inaccessible to the first computer—and send the doubly encrypted rule back to the first computer. The first computer can then partially decrypt the rule using the second encryption key. The second computer can then encrypt data with the first encryption key and send to the first computer. The first computer can then determine if the partially encrypted rule matches the encrypted data.

Figure 1:
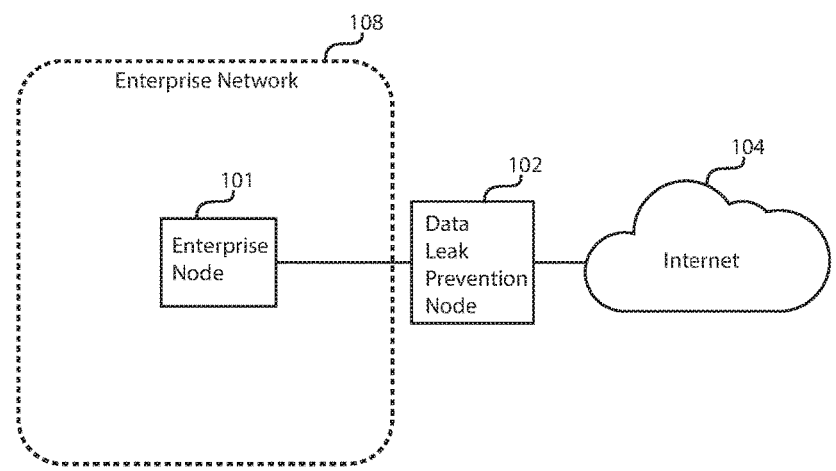
FIG. 1 illustrates an exemplary network configuration in which a system for blind cloud data leak prevention may be implemented.

FIG. 1 illustrates an exemplary network configuration in which a system for blind cloud data leak prevention may be implemented. Enterprise network 108 can represent a cloud-provided enterprise network. For example, the enterprise might pay a cloud network provider to host enterprise network 108. In some embodiments, enterprise data is hosted in a cloud environment; in such embodiments, enterprise network 108 can represent the cloud provider and enterprise node 101 can represent the node storing the enterprise data. Enterprise network 108 can represent an internal network that is generally separated (physically or logically) from external networks such as internet 104. The periphery of enterprise network 108 can include firewalls, routers, gateways, etc., to limit or otherwise control data entering and/or exiting enterprise network 108. Enterprise network 108 can include various interconnected networks that are connected using tunnels, virtual private networking protocols, etc., but are otherwise geographically or logically distinct. Enterprise network 108 can include compute nodes, data storage nodes, data transport nodes, human interface nodes, etc. In some embodiments, at least a portion of enterprise network 108 is "virtualized" and corresponding nodes may be virtual machines, containers, or similar processes. In some embodiments, the connection between enterprise node 101 and data leak prevention node 102 is through the Internet 104. For example, such a connection can be a secure tunnel from a cloud-hosted enterprise network 108.

The principles disclosed herein can be effective to generally prevent protected data from leaving enterprise network 108. For example, a requestor might submit a request to retrieve data from enterprise node 101. Enterprise node 101 can determine whether the data matches a rule in consultation with data leak prevention node 102. If the data matches the rule, the request can be denied; otherwise, the request can be allowed, and the data can be allowed to exit the enterprise network 108.

Enterprise node 101 can represent any node on enterprise network 108 that can transmit data outside of enterprise network 108. For example, enterprise node 101 can be a compute node (e.g., processing server), storage node (e.g., network storage device or a database server), transport node (e.g., router, switch, gateway, etc.), human interface node (e.g., computer terminal, tablet, phone, laptop, or personal computer), etc. In some embodiments, enterprise node 101 represents a collection of nodes within enterprise network 108.

Data leak prevention node 102 can be external to enterprise network 108 in some embodiments. "External" can mean that data from data leak prevention node 102 is required to pass through a firewall in order to reach a destination within enterprise network 108. In other embodiments, data leak prevention node 102 can be internal to enterprise network 108, including on the periphery of enterprise network 108. For example, a periphery security module that includes a firewall can also include data leak prevention node 102. In some embodiments, all data that leaves enterprise network 108 must pass through data leak prevention node 102. Alternatively or additionally, data leak prevention node 102 can be consulted before data leaves enterprise network 108 while the data leaves through a different path. In some embodiments, data leak prevention node 102 can be implemented in other situations where data might otherwise leave enterprise network 108, such as data being transferred to removable media (e.g., USB flash drives, optical disks, cellular phones, tablets, laptops, paper printer, 3D printer, etc.), removable media being taken offsite (or otherwise removed from a secure zone), a direct connection through enterprise network 108 that might not include Internet 104, etc.

Data leak prevention node 102 can also be used internally within enterprise network 108 even when data is not being exported. For example, different users within enterprise network 108 may have varying access privileges, and data leak prevention node 102 can assign a privilege level associated with various data and files. Enterprise network 108 can be a sub-network within a larger private network. For example, enterprise network 108 can be specific to a department of an organization. Enterprise network 108 can also be a virtual network hosted by a third party or logically isolated from other virtual networks hosted by the third party.

In some embodiments, enterprise network 108 complies with certain regulatory or security policies such that certain classifications of data are not allowed to exit enterprise network. For example, personally identifiable information (e.g., at a hospital, school, government agency, etc.) or other confidential information (e.g., trade secrets, agreements, customer or supplier information, financial information, national security information, etc.) can be required to be kept within enterprise network 108. As data is leaving or about to leave enterprise network 108, data leak prevention node 102 can determine a security attribute associated with the data and determine whether it is appropriate for the data to leave enterprise network 108. Data leak prevention node 102 can be included within a firewall, work with a firewall, etc.

The data referenced herein can include folders, files, databases, physical media, data streams such as audio or video, metadata (data describing data, regardless of whether it is attendant with the data it describes), a portion of the preceding, or any other data that may contain confidential or otherwise sensitive information.

Figure 2:
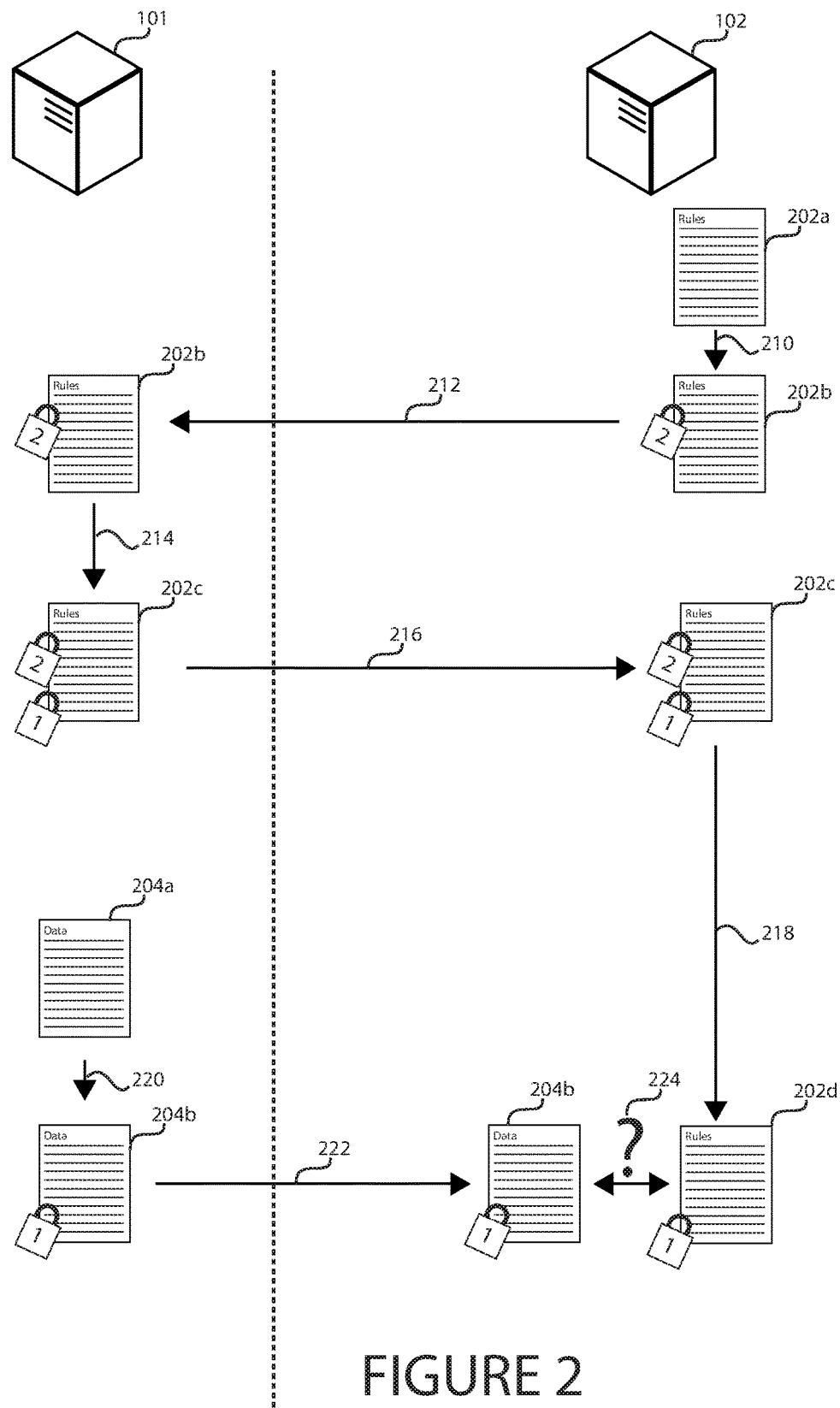
FIG. 2 is a flowchart illustrating an exemplary method for blind data leak prevention.

FIG. 2 is a flowchart illustrating an exemplary method for blind data leak prevention from enterprise node 101. Data leak prevention node 102 can have rules 202 for a data leak prevention analysis. Data 204 supplied from enterprise node 101 can be checked against rules 202 to determine if data 204 contains any protected information. Enterprise node 101 can encrypt rules 202 and data 204 using a first encryption key (indicated by the "1" lock), while data leak prevention node 102 can encrypt rules 22 using a second encryption key (indicated by a "2" lock). Different versions of rules 202 (e.g., 202a, 202b, 202c, and 202c) and different versions of data 204 (e.g., 204a and 204b) represent various encrypted versions (and/or other altered versions) of rules 202 and data 204.

Rules 202 can include predefined key words, watchwords, or flags (e.g., "confidential", "top secret", "social security number", "health history", "diagnosis", "acct #", etc.) that indicate that information may be of a confidential nature (e.g., protected information). Rule 202 can include specific references to confidential information such as codenames (e.g., "project eclipse"), specific names, specific phone numbers, diagnoses (e.g., "HIV positive"), or any combination of the foregoing. Rule 202 can also include variations of the foregoing information. For example, variations of "John Smith" can include "John 5", "john s", "J Smith", etc. Data leak prevention node 102 can automatically identify such protected information (e.g., watchwords, etc.) and generate variations using such techniques as machine learning. Such protected information may be received from a node within enterprise network 108, an external resource, or some combination thereof. For example, data leak prevention node 102 can receive watchwords from a third party or be preinstalled with the watchwords, while confidential information can be received from enterprise node 101.

Rule 202 can also include templates that describe protected information (e.g, "###-##-####" can indicate a pattern for a social security number). Such information templates or profiles can indicate that appearance in a certain pattern may be indicative of protected information. For example, the word "confidential" appearing in the body of a text may not be indicative of protected information, but "confidential" appearing in a header or footer may indeed be indicative of protected information.

In some embodiments, the enterprise does not have control of the security of the data leak prevention node 102, and it can be said that the enterprise does not trust the DLP provider. Within a cloud environment (e.g., where enterprise node 101 is not hosted at an enterprise datacenter), the enterprise typically does not trust data leak prevention node 102. This may occur because data leak prevention node 102 is hosted by the DLP provider. When the enterprise does not trust the DLP provider, the enterprise will not wish to provide unencrypted data to data leak prevention node 102. In order to satisfy the security requirements of enterprise network 108 while still taking advantage of the ability of data leak prevention node 102 to detect protected information, enterprise node 101 can encrypt data 204a using a first encryption key as indicated by the "1" lock, resulting in encrypted data 204b in step 220. The data encryption can be accomplished using a first encryption key that is inaccessible to data leak prevention node 102.

Enterprise node 101 can then transmit the encrypted data 204b to data leak prevention node 102 in step 222. Data leak prevention node 102 may have a version of rules 202d that have also been encrypted with the first encryption key (e.g., enterprise node 101 can encrypt rules 202 with the first encryption key). Data leak prevention node 102 can then compare the encrypted data 204b with the encrypted rules 202d in step 224. In order to compare the encrypted data 204b with rules 202d, data leak prevention node 102 can use a version of rules 202 that has been encrypted based on the first encryption key. A portion of data 204 would result in the same encrypted value as would the corresponding watchword from rules 202. For example, the encryption version of "full name:" may appear as "0xEE42ABC8151637D8291A" in rules 202, and "Patient full name: John Smith" might be encrypted to appear as "66B09A0A9312C58C0xEE42ABC8151637D8291A D3D7B403F062CA664724E4CD" in data 204. The underlined portion of the encrypted version of data 204 is a match to the corresponding watchword from rules 202. Thus, data leak prevention node 102 can be unaware that the bolded portion of the encrypted version of data 204 corresponds to "John Smith" but data leak prevention node 102 can still identify that data 204 matches a watchword in rules 202.

Data leak prevention node 102 can acquire a version of rules 202 that has been encrypted with the first encryption key by first sending rules 202 to enterprise node 101, which can then encrypt rules 202 with the first encryption key. Rules 202a may contain proprietary information, and it may be undesirable for data leak prevention node 102 to send rules 202 to enterprise node 101 without encryption. Thus, enterprise node 101 can have protected information that data leak prevention node 102 should not see, while data leak prevention node 102 can have protected information that enterprise node should not see. In order to allow enterprise node 101 to encrypt rules 202a while simultaneously preventing enterprise node 101 from accessing unencrypted rules 202, data leak prevention node 102 can encrypt rules 202a with a second encryption (step 202); the second encryption can be designated using the "2" lock.

Data leak prevention node 102 can then send encrypted rules 202b to enterprise node 101 in step 212. In some embodiments, data leak prevention node 102 may send only the portion of (encrypted) rules 202b that may be relevant to efficiently use resources. For example, enterprise node 101 can indicate that it will be sending data out that might contain medical information; and data leak prevention node 102 can then identify a subset of rules that are relevant to medical information in encrypted rules 202b.

Enterprise node 101 can then encrypt encrypted rules 202b with the first encryption (step 214). Because encryption might not rearrange the order of data in rules 202, enterprise node 101 can rearrange data within rules 202 before or after applying the second encryption. This can prevent a first item in rules 202c corresponding to a first item in rules 202c, which could compromise some encryption.

Protected information can describe edges of a graph data structure even if the nodes are not protected. For example, the identities of employees at an organization and what percentage received demotions may not be protected information, but the identities of employees who received the demotions may be protected. In such an environment, enterprise node 101 can provide information regarding the employees and the types of promotions that were received without associating which employees received which demotion. This information can be added to rules 202b in plaintext, or encrypted with the first encryption.

Enterprise node 101 can then send the doubly encrypted rules 202c to data leak prevention node 102 in step 216. Data leak prevention node 102 can then partially decrypt rules 202c using the second encryption key, resulting in rules 202d that are only encrypted using the first encryption. This can be achieved when both enterprise node 101 and data leak prevention node 102 use a commutative form of encryption. Commutative encryption enables multiple-encrypted data to be decrypted in any order.

Encryption, as discussed herein, can include various encryption or ciphering techniques known in the art as long as they are commutative. In some embodiments, the DLP provider does not have access to a key to decrypt the enterprise data. Similarly, in some embodiments, the enterprise does not have access to a key to decrypt the rules 202.

To enable protected information template matching within an encrypted comparison, enterprise node 101 can modify data 204*a* before applying the first encryption. For example, enterprise node 101 can use a substitute (e.g., "%") in place of various characters (e.g., numbers, alpha characters, etc.). Thus, enterprise node 101 can modify data 204 so that "123-45-6789" becomes "%%%-%%-%%%%" while rule 102 can contain "%%%-%%-%%%%". Similarly, other characters, classes of characters, etc., can be represented by a single representation. As such, all combinations of possible values that satisfy the protected information template are not required to be created. Care can be taken to ensure that modifying data 204 does not result in false-positives. For example, if data 204*a* actually contains the symbols "%%%-%%-%%%", then replacing numerals with "%" can be problematic. To overcome these difficulties, replacement symbols (e.g., uncommon or unused symbols) can be used. It should be understood that many DLP solutions would disfavor modifying the data before analysis as this could undesirably use resources.

Similarly, rule 202 might contain proprietary information that the creators of data leak prevention node 102 might not want to be exposed. For example, if data leak prevention node 102 is operated by a third party, that party might have invested resources to determine the best watchwords, etc., to be included within rule 202 and may not want enterprise node 101 to have access to rule 202.

FIG. 3 shows an example of how encrypted data (e.g., data 204) can be matched to rules (e.g., rules 202). Encryption example 300*a* can correspond to rules 202. For example, in encryption 300*a*, the plaintext "confidential" can be encrypted to be "0x81AC1A1E91F993129A0A8FDC". The selected encryption algorithm (e.g., for the first encryption) can be accomplished in groupings such as group 302. In this example, "en" encrypts to "0x9312". Groupings of various sizes are contemplated (e.g., two, four, eight, sixteen, thirty two, etc., bytes at a time, or any combination or intermediary thereof). The larger the groupings are (e.g., 8 bytes or more), the more secure the encryption will be. To provide a sufficiently level of security, it is suggested that the minimum group size is at least 4 bytes. For ease of explanation and simplicity, we use a group size of 2 to show how encryption, decryption and matching is done.

Encryption example 300*b* can represent an encryption of data 204 using the first encryption. The plaintext "This contains confidential information" can be encrypted as "0x74DE770BDBC1D318F6CD8820B5F2 81AC1A1E91F993129A0A8FDC76EA1A1ED38E91DA9 A0AD318". In this example, "confidential" is encrypted to "0x81AC1A1E91F993129A0A8FDC". For this example, the encryption algorithm and its keys and parameters used is as follows: $E(e, m) = m^e \mod P$, and $D(d, m) = m^d \mod P$, where P is a large prime number, and the encryption key e is chosen such that $\gcd(e, p-1) = 1$, and the decryption key d is chosen such that $d*e \mod (p-1) = 1$; see Table 1 for example values of e, d, and P for blind cloud DLP.

TABLE 1

|  | e | d | P |
| --- | --- | --- | --- |
| Enterprise node | 7 | 28087 | 65537 |
| Cloud DLP | 5 | 52429 | 65537 |

According to the above example, for an enterprise node to encrypt a message M (or portion of a message), the system must first convert M to a number m. This can include padding M with filler numbers. Thus, M ("co" of "confidential") converts to m (25455) which can then be encrypted by raising it to the enterprise node's e of 7 and modulating by P of 65537. This results in an encrypted rule portion of 33196 (or 0x81AC in hexadecimal notation).

On the DLP side, the rule containing "confidential" can be encrypted using cloud DLP's e of 5 which results in "co" being encrypted to 0x904E. The enterprise node then encrypts the message again using an e of 7: $0x804E^7 \mod(65537)$ which results in 0xE76A. The DLP can then partially decrypt the doubly encrypted message using d of 52429 by raising 0xE76A to the power of 52429 modulus 65537. This results in the encrypted rule of "co" being encrypted to 0x81AC which will match the encrypted message as provided above. This has been done without the cloud DLP knowing the enterprise node's e, thus preventing the cloud DLP from decrypting the contents of the message. Further, the enterprise does not know cloud DLP's e and thus cannot decrypt the contents of the cloud DLP's rules.

The portion 304 is underlined here to indicate that it matches the result of encrypted example 300*a*. Data leak prevention node 102 can compare encryption example 300*b* to encryption example 300*a* determine that encryption example 300*b* contains "confidential" within its text, even though data leak prevention node 102 is unable to determine other parts of the plaintext.

Encryption example 300*c* can represent situations where the grouping does not align with the beginning of a rule that should be matched. For example, "confidential" does not align with the beginning of a grouping, and the "c" is grouped with it preceding space character. Thus, "con . . . " encrypts to "0xDBC1D318 . . . " and would not match the encrypted rule from example encryption 300*a*. One technique to overcome this limitation is for enterprise node 102 to encrypt data 204 beginning at an offset. Example encryption 300*d* has begun at an offset in comparison to example encryption 300*c*. For example, the "T" has been removed in the beginning of the text. This offset allows "confidential" to align appropriately within groupings and allows for the word to be flagged appropriately.

When enterprise node 101 encrypts data 204, it can encrypt multiple versions of data 204, each version corresponding to a different offset. The number of offset versions can correspond to the number of bytes in the grouping used in the encryption algorithm. For example, if the text is "This is private information" and the encryption algorithm uses groupings of 16 bytes, versions with no offset ("This is private information"), one offset ("his is private information"), two offsets ("is is private information"), etc., until the fifteenth offset ("information") is created.

A protected information template may indicate that if a watchword or phrase is identified multiple times in a document, then it should be marked as protected; but when the watchword is only identified a single time, it can be allowable. Rule 202 might then match one section of two different offset versions of data 204. Data leak prevention node 102 can then determine that the watchword was located twice within data 204 because it was found once in two of the offset versions.

Sometimes the end of data 204 does not neatly align within a grouping. For example, in FIG. 4, example encryption 400*a* shows how " . . . confidential" might not align within a final grouping (e.g., "1" does not fit the 2-byte grouping in this encryption). One technique for address such misalignment is to prepend the final grouping with bytes from the preceding grouping until the end of data 204 fits a grouping. For example, in example encryption 400b, an "a" has been prepended from the penultimate grouping to the final grouping to form "confidential". This can assist data leak prevention node 102 in identifying bytes that correspond with rule 202.

In some embodiments, data leak prevention can identify partial matches of rule 202 with data 204. For example, because of misalignment with groupings, a portion of data 204 that would match rule is broken up so that one portion matches but another portion does not match (because it is encrypted in conjunction with other data). For example, if groupings are of 8 bytes and a watchword is "confidential" then "confiden" could fit within one group while "tial****" would be in the next group. Thus, data containing "confidential documents" and "confidential papers" would have the first 8-byte encryption grouping be identical while the subsequent grouping would be different. The technique of prepending a portion of the penultimate grouping into the ultimate grouping can ensure that such matches are preserved. Another technique to overcome this limitation is to allow a percentage of a match be sufficient to constitute a match. For example, if 90% of the rule matches the data, the data can be deemed to contain protected information. Rules 202 can indicate what percentage of match is required.

If rule 102 does not neatly fit within groupings, another approach can be to duplicate the rule with prepended or appended bytes that are likely to precede or follow the rule. Such prepending may apply to a "*" such as appears in example encryption 400c, a space as in example encryption 400d, or any other character that might precede the rule. In some embodiments, a version of the rule corresponding to each possible preceding or following character(s) can be created.

FIG. 6 illustrates an exemplary computing system 500 that may be used to implement some embodiments of the present invention. For example, any of the computer systems or computerized devices described herein may, in at least some cases, be a computing system 500. The computing system 500 of FIG. 5 includes one or more processors 510 and memory 510. Main memory 510 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

Figure 5:
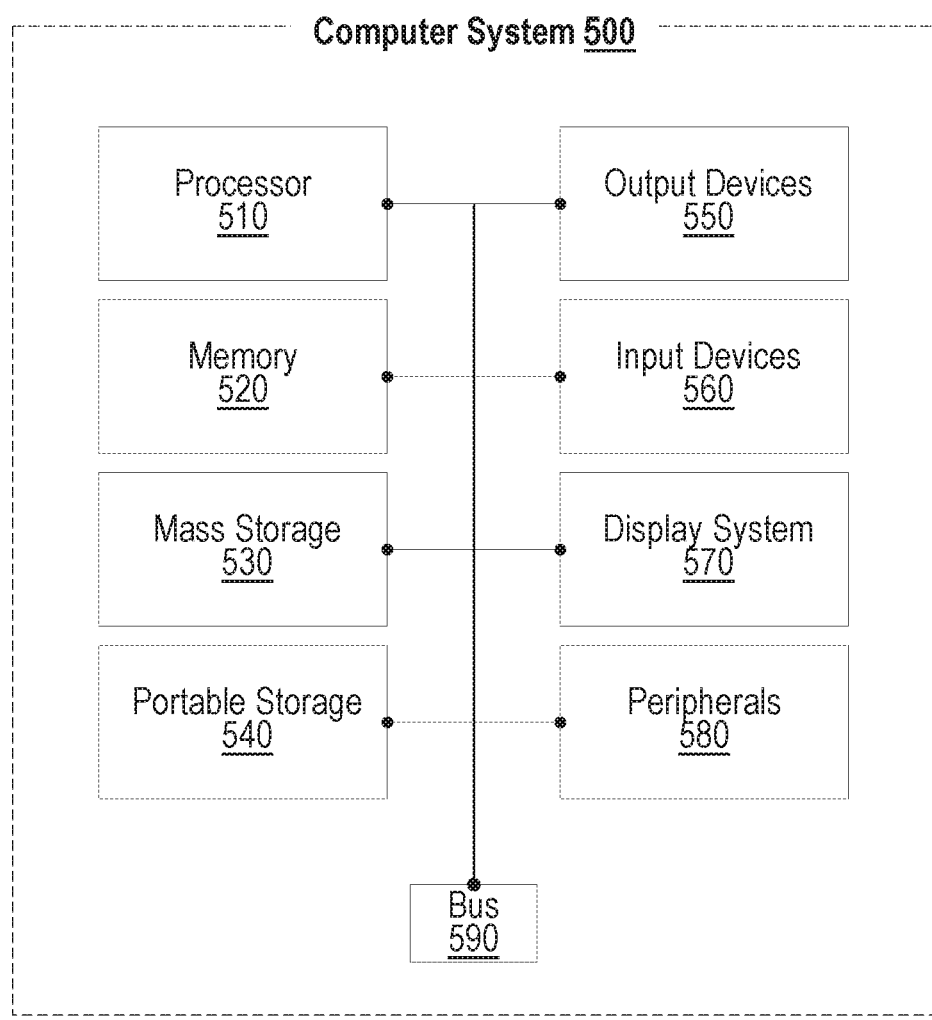
FIG. 5 illustrates an exemplary computing system that may be used to implement an embodiment of the present invention.

The components shown in FIG. 5 are depicted as being connected via a single bus 590. However, the components may be connected through one or more data transport means. For example, processor unit 510 and main memory 510 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 500 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 500 may be part of a multi-computer system that uses multiple computer systems 500, each for one or more specific tasks or purposes. For example, the multi-computer system may include multiple computer systems 500 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 500 from different networks communicatively coupled together via the internet (also known as a "distributed" system).

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for blind data leak prevention, the method comprising:
    receiving at a first computing device that is external to a secure network:
        a rule sent from a second computing device inside the secure network and encrypted based on a first encryption key, wherein the first encryption key is accessible to the second computing device but not accessible to the first computing device; and
        encrypted data from the second computing device, wherein the received encrypted data is encrypted based on the first encryption key by:
            identifying that the encryption based on the first encryption key occurs in byte groups of a predetermined number of bytes in size, and
            applying the encryption a number of times corresponding to a predetermined number of bytes and resulting in a plurality of encrypted versions, each encrypted version beginning at an offset of a different number of bytes up to the predetermined number of bytes by:
                identifying a final number of bytes in a last byte group of each encryption,
                identifying that the identified final number of byes does not yet equal the predetermined number of bytes; and
                prepending one or more preceding bytes to the last byte group until the final number of bytes equal the predetermined number of bytes; and
    executing instructions stored in memory of the first computing device, wherein execution of the instructions by a processor of the first computing device:
        evaluates the received encrypted data to identify that the received encrypted data corresponds to the rule, wherein the received encrypted data remains encrypted during the evaluation; and
        processes the received encrypted data based on the identification that the received encrypted data corresponds to the rule, wherein the received encrypted data remains encrypted during processing.

2. The method of claim 1, further comprising:
    receiving a request from a requesting device for the received encrypted data; and
    identifying that the requesting device is external to the secure network that includes the second computing device, wherein processing the encrypted data includes preventing the transmission of the received encrypted data to the requesting device according to the rule.

3. The method of claim 1, further comprising:
    initially encrypting the rule with a second encryption key at the first computing device;
    sending the rule from the first computing device to the second computing device for further encryption based on the first encryption key; and
    decrypting the rule based on the second encryption key after receiving the rule back from the second computing device, wherein the decrypted rule remains encrypted based on the first encryption key.

4. The method of claim 1, wherein the rule is further encrypted by the second computing device by:
    identifying a final number of bytes in a last byte group in the rule;
    identifying that the final number of bytes in the last byte group in the rule does not equal the predetermined number of bytes; and
    prepending one or more preceding bytes to the last byte group in the rule until the final number of bytes in the rule equals the predetermined number of bytes.

5. An apparatus for blind data leak prevention, the apparatus comprising:
    a communications interface that:
        receives a rule sent over the communications interface from a second computing device inside a secure network and encrypted based on a first encryption key, wherein the first encryption key is accessible to the second computing device but not accessible to the first computing device;
        receives the encrypted data sent over the communications interface from the second computing device, wherein the received encrypted data is encrypted based on the first encryption key by:
            identifying that the encryption based on the first encryption key occurs in byte groups of a predetermined number of bytes in size, and
            applying the encryption a number of times corresponding to a predetermined number of bytes and resulting in a plurality of encrypted versions, each encrypted version beginning at an offset of a different number of bytes up to the predetermined number of bytes by:
                identifying a final number of bytes in a last byte group of each encryption,
                identifying that the identified final number of byes does not yet equal the predetermined number of bytes; and
                prepending one or more preceding bytes to the last byte group until the final number of bytes equal the predetermined number of bytes;
    a processor that executes instructions stored in memory, wherein execution of the instructions by the processor:
        evaluates the received encrypted data to identify that the received encrypted data corresponds to the rule, wherein the received encrypted data remains encrypted during the evaluation, and
        processes the received encrypted data based on the identification that the received encrypted data corresponds to the rule, wherein the received encrypted data remains encrypted during processing.

6. The apparatus of claim 5, wherein:
    the communication interface further receives a request from a requesting device for the received encrypted data, and
    the processor executes further instructions to identify that the device is external to the secure network that includes the second computing device and to process the received encrypted data by preventing the transmission of the received encrypted data based on the rule.

7. The apparatus of claim 6, wherein the rule is further encrypted by the second computing device by:
- identifying a final number of bytes in a last byte group in the rule;
- identifying that the final number of bytes in the last byte group in the rule does not equal the predetermined number of bytes; and
- prepending preceding bytes to the last byte group in the rule until the final number of bytes equals the predetermined number of bytes.

8. The apparatus of claim 5, wherein the processor executes further instructions to initially encrypt the rule with a second encryption key, wherein the communication interface sends the rule from the first computing device to the second computing device for further encryption based on the first encryption key, and the processor executes further instructions to decrypt the rule based on the second encryption key after receiving the rule encrypted based on the first and the second encryption key back from the second computing device when the decrypted rule remains encrypted based on the first encryption key.

9. A non-transitory computer-readable storage medium having embodied thereon a program executable by a processor to perform a method for blind data leak prevention, the method comprising:
- receiving at a first computing device that is external to a secure network:
  - a rule sent from a second computing device inside the secure network and encrypted based on a first encryption key, wherein the first encryption key is accessible to the second computing device but not accessible to the first computing device, and
  - encrypted data from the second computing device, wherein the received encrypted data is encrypted based on the first encryption key by:
    - identifying that the encryption based on the first encryption key occurs in byte groups of a predetermined number of bytes in size, and
    - applying the encryption a number of times corresponding to a predetermined number of bytes and resulting in a plurality of encrypted versions, each encrypted version beginning at an offset of a different number of bytes up to the predetermined number of bytes by:
      - identifying a final number of bytes in a last byte group of each encryption,
      - identifying that the identified final number of byes does not yet equal the predetermined number of bytes; and
      - prepending one or more preceding bytes to the last byte group until the final number of bytes equal the predetermined number of bytes;
- evaluating the received encrypted data to identify that the received encrypted data corresponds to the rule, wherein the received encrypted data remains encrypted during the evaluation; and
- processing the received encrypted data based on the identification that the received encrypted data corresponds to the rule, wherein the received encrypted data remains encrypted during processing.

10. The non-transitory computer-readable storage medium of claim 9, further comprising executable instructions for:
- receiving a request from a requesting device for the received encrypted data; and
- identifying that the requesting device is external to the secure network that includes the second computing device, wherein processing the received encrypted data includes preventing the transmission of the received encrypted data to the requesting device according to the rule.

11. The non-transitory computer-readable storage medium of claim 9, further comprising executable instructions for:
- initially encrypting the rule with a second encryption key at the first computing device;
- sending the rule from the first computing device to the second computing device for further encryption based on the first encryption key; and
- decrypting the rule based on the second encryption key after receiving the rule back from the second computing device, wherein the decrypted rule remains encrypted based on the first encryption key.

12. The non-transitory computer-readable storage medium of claim 9, wherein the rule is further encrypted by the second computing device based on: identifying a final number of bytes in a last byte group in the rule; identifying that the final number of bytes in the last byte group in the rule does not equal the predetermined number of bytes; and prepending preceding bytes to the last byte group in the rule until the final number of bytes equals the predetermined number of bytes.

* * * * *